United States Patent [19]
Corser et al.

[11] Patent Number: 5,827,558
[45] Date of Patent: Oct. 27, 1998

[54] COMPOSITE SHRIMP PRODUCTS AND METHOD OF MAKING THE SAME

[75] Inventors: Michael Francis Corser, Plant City; Roberto E. López-Ibáñez, Miami, both of Fla.

[73] Assignee: Ladex Corporation, Miami, Fla.

[21] Appl. No.: 921,609

[22] Filed: Sep. 2, 1997

[51] Int. Cl.[6] .................................................. A22C 29/02
[52] U.S. Cl. ............................................. 426/274; 426/643
[58] Field of Search .................................... 426/643, 104, 426/132, 140, 138, 274, 92

[56] References Cited

U.S. PATENT DOCUMENTS

| | | | |
|---|---|---|---|
| 3,615,686 | 10/1971 | Marshall | 426/643 |
| 4,199,603 | 4/1980 | Sortwell | 426/104 |
| 4,362,752 | 12/1982 | Sugino | 426/104 |
| 4,371,560 | 2/1983 | Hochhauser | 426/643 |
| 4,396,634 | 8/1983 | Shenouda | 426/104 |
| 4,396,643 | 8/1983 | Shenouda | 426/643 |
| 4,411,917 | 10/1983 | Chang | 426/104 |
| 4,562,082 | 12/1985 | Morimoto | 426/104 |
| 4,579,741 | 4/1986 | Hanson | 426/104 |
| 4,584,204 | 4/1986 | Nishimura | 426/643 |
| 4,692,341 | 9/1987 | Ikeuchi | 426/643 |
| 4,720,391 | 1/1988 | Kawana | 426/643 |
| 4,816,276 | 3/1989 | Blazevich | 426/643 |
| 5,188,854 | 2/1993 | Hartman et al. | |
| 5,431,938 | 7/1995 | Kou | |

OTHER PUBLICATIONS

Gisslen 1995 Professional Cooking John Wiley & Sons Inc New York pp. 344, 345, 346, 362, 363.

*Primary Examiner*—Carolyn Paden
*Attorney, Agent, or Firm*—Spencer & Frank

[57] ABSTRACT

A process of making a composite shrimp product from at least two individual deheaded and peeled shrimp and a shrimp product made by the process. A bonding agent is applied to at least one of the shrimp and the two shrimp are placed in contact with each other such that the bonding agent holds the two shrimp together.

34 Claims, 1 Drawing Sheet

CENTER PIECE

RING/WRAP PIECE

RING/WRAP PIECE

CENTER PIECE

COMPOSITE SHRIMP PRODUCTS AND METHOD OF MAKING THE SAME

BACKGROUND OF THE INVENTION

1. Field of the Invention

The present invention relates to the field of processing fresh shrimp into a larger frozen shrimp composite for commercial distribution.

2. Technology Background

Shrimp, which are one of the most popular seafood delicacies, are commercially available in a wide range of sizes. They are graded by the number of shrimp required to make up one pound by weight. The smallest commercially useful shrimp are in the 500 count range but fully grown tropical one pound shrimp are also available.

Shrimp sizes between 150 count to about 30 count are most commonly sold for consumption in restaurants and food outlets. Jumbo shrimp, often sold at a premium price, are in the 16–25 count range. The average consumer has a preference for larger shrimp over smaller shrimp. This preference, however, cannot always be accommodated by the available supply of shrimp whether the shrimp is ocean caught or harvested from shrimp farms.

Generally, fresh shrimp are first processed by packers who grade and segregate shrimp according to size. The shrimp can then optionally be deheaded, the lower appendages including the legs and swimerettes can be cut off, and the shells and tails may or may not be removed. The various types of graded shrimp may then be preserved by freezing in blocks or individually and can then be sold to distributors or further processed for sale to customers, markets, restaurants and food outlets.

Since there is a more abundant supply of smaller shrimp and a greater demand for larger shrimp, there is a need for a method by which the smaller readily available shrimp can be used to simulate the larger more desirable shrimp to accommodate the demand for this delectable and popular food. There is also a need to provide a method of producing a line of shrimp products which enhances the mix offered by companies limited to specific shrimp sizes and which allows them to provide a larger shrimp product than would otherwise not be abundant naturally.

There is further a need to provide a product that is not only specifically engineered to resemble a larger size shrimp, but which also provides a composite shrimp food product that could be priced lower than similarly sized natural occurring shrimp without sacrificing taste, quality, and/or performance capabilities as to the final end use or ultimate cooking preparation.

SUMMARY OF THE INVENTION

The present invention provides a process, and a product thereof, which help meet the demand for this larger size popular crustacean food at a competitive price without reducing gastronomic expectations. It is the object of the present invention to provide a process for making what appears to be a larger size shrimp, and a shrimp product which meets the above noted needs.

The present invention fulfills these needs by providing a shrimp composite product which has the appearance of a large shrimp, and a method for producing such a product, by assembling a plurality of smaller shrimp into a shrimp composite, comprising the steps of: providing a supply of raw, deheaded, peeled shrimp; removing the tails from a quantity of these shrimp and cutting the shrimp to form butterfly buttonhole-Western cut ring/wrap shrimp pieces; cutting a similar quantity of shrimp to form butterfly three-fourths cut center shrimp pieces; enveloping or coating the cut shrimp pieces with a binder or bonding agent; placing the binder agent-enveloped/coated ring/wrap shrimp piece on top of and around each of the binder agent-enveloped/coated center shrimp pieces to form a composite which has an appearance of a larger size shrimp. The composite shrimp may also rest at a cool temperature to allow excess moisture to escape and to enhance bonding. The composite shrimp may also be preserved by freezing; may optionally have an additional surface glazing with a starch-based agent; may be coated with an edible coating; and may be pre-cooked.

The final shrimp composite product has the appearance of a shrimp larger in size than either of the cut shrimp pieces. The product may be in various sizes, coated or uncoated, tail-on or tailless and can be comprised of the same or different species of shrimp.

BRIEF DESCRIPTION OF THE DRAWINGS

The present invention will become more fully understood from the detailed description given herein and the accompanying drawings which are given by way of illustration only, and thus not limitative of the present invention.

DETAILED DESCRIPTION OF THE PREFERRED EMBODIMENTS

Figure 1:
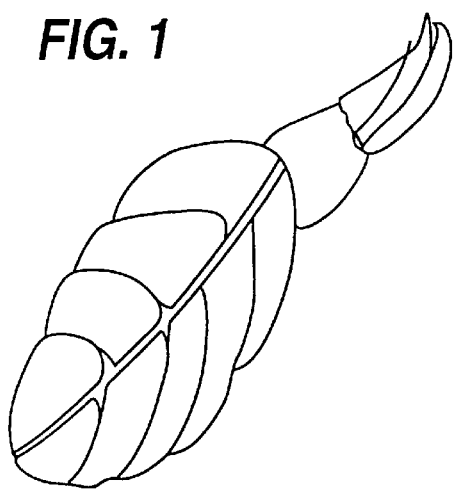
FIG. 1 depicts a three-fourths cut butterfly tail-on shrimp which comprises the center piece substrate.

The production method of the present invention involves running headless shell-on shrimp through a mechanical grading machine that separates each individual shrimp by size category. Once the raw headless shell-on shrimp have been graded into different size categories (i.e., size 71/90 shell-on, 90/110 shell-on, etc.), the shrimp are peeled and the tails are removed from some of the peeled shrimp. As expected, handling of the shrimp at all stages of the process is performed under conditions which minimize development of microorganisms and harmful bacteria in the shrimp. All of the equipment used in the preparation of the final product such as mesh trays, buckets, containers, tables, etc. should be sanitized using a disinfectant solution every one to two hours during their utilization. Personnel hands must be carefully sanitized every one to two hours during product preparation. A dip and wash in a mixture solution of liquid iodine is an acceptable methodology as is any generally known sanitizing method utilized in this industry.

A quantity of peeled, tail-off shrimp are cut into butterfly buttonhole-Western cut shrimp for use as the ring/wrap substrate shrimp. An equal quantity of peeled shrimp which have the last segment of the shell and the tails still remaining, which may or may not be substantially equal in size to the shrimp used for the ring/wrap substrate, are cut into three-fourths cut butterfly shrimp for use as the center piece substrate shrimp. Although shrimp of equal or similar size can be used, preferably, the center shrimp piece is smaller than the ring shrimp piece. Alternatively, an equal quantity of tail-off shrimp may be prepared as the center piece substrate shrimp if the final composite shrimp embodiment is to be tailless.

The similarly cut shrimp are then coated or enveloped with a binder or bonding agent to develop bonding/adhesive capabilities. The adhesive qualities of the binder or bonding agent unites and cements the shrimp substrates to form the composite shrimp product. Any edible binder or bonding agent may be utilized. For example, MS-27 which is available from Advanced Food Systems, Inc., of 69 Veronica Avenue, Somerset, N.J., 08873, and which is a modified food starch-based product is not only used to bind the substrate shrimp pieces together but also this product may be utilized in further processing the composite shrimp such as to coat the shrimp with breading, cracker crumbs, spices and combinations of these or other similar edible coatings.

The MS-27 product generally comes prepackaged in 50 lbs. bags and has the appearance of a white powder. It is normally dissolved in water at a ratio of about 33.5% MS-27 and about 66.5% water. To prepare a 50 lb. batch of MS-27 Starch Solution the following are needed: (1) 75 to 125 gallon mixing tank preferably constructed of stainless steel [The mixing tank needs to be fitted with a variable speed (425-rpm to 900-rpm) low sheer mixer. It must also have a drain tube fitted with a valve.]; (2) MS-27 product; (3) potable water; (4) ice; (5) dry powder chlorine; (6) chlorine level quick test such as the "Taylor DPD Chlorine Test"; and (7) a scale accurate to a tenth of a pound.

The process for the preparation of a 50 lb. batch of MS-27 Starch Solution is as follows: (1) Add 16.5 lbs. of water to the mixing tank. (2) Add chlorine to the water until a 20 ppm level is reached. Use the chlorine level test kit to verify the chlorine concentration (level). (3) Carefully weigh 16.5 lbs of MS-27 dry powder using a scale. (4) Turn the mixer on at mid-speed and start adding the MS-27 powder in 1 lb. increments until all the starch is diluted in the solution. (5) Turn the mixer off and carefully inspect (using a plastic or stainless paddle) the bottom of the mixing tank to verify that no dry lumps of starch have formed during the mixing. (6) Add 16.5 lb of ice to the solution and mix for a period of about 3 minutes. (7) Turn the mixer off and allow for the ingredients to disperse for a period of 10 minutes. Occasionally stir the solution by cycling the mixer on and off every 3 minutes during this period. (8) Mix one last time prior to dispensing. The solution should have the appearance of a mildly viscous milky liquid. The color should be uniform and it normally develops foam on the surface from the agitation process. The temperature of the solution should range between about 33° F. and about 40° F.

The binder agent is the adhesive component of the composite shrimp product and it has several functions. It binds the substrate shrimp pieces to form the composite shrimp. It provides sufficient bonding to sustain limited further processing, such as IQF freezing, packaging, transportation, breading or further additional recipe or cooking preparation steps without disruption to the shape. Some of the binder agents also help to prevent product dehydration of either the raw or the frozen composite shrimp during transportation and storage; enhance the coating adhesion to the shrimp composite; reduce product shrinkage during the pre-cooking and/or cooking processes; eliminate the cavern-like appearance between the coating and the substrate that sometimes happens when frying or cooking coated shrimp; and enhance product flavor, texture and "bite". Most importantly, the binder or bonding agent effectively adheres the final product together as a whole during the most crucial time when the consumer cuts into the composite product or eats it by biting into the product.

It is important to note that the reasons the cohesion of the present composite shrimp product is maintained are the combination of: (1) the binder or bonding agent used in the preparation of the substrate pieces, (2) the specific arrangement and configuration of these substrate pieces, and (3) the glue-like effect that the ingredients used in the preparation have with the outer coating or breading.

One method of enveloping or coating the shrimp with a binder or binding agent, such as the MS-27 starch-based solution, is by placing the peeled, similarly cut shrimp substrates in separate containers (preferably plastic containers) which are filled with the starch-based solution. The shrimp are fully submerged and maintained in the viscous starch based binding solution for a minimum period of about 45 minutes and are hand massaged every 5 minutes. Alternatively, a vacuum tumbler may be utilized. This procedure requires the utilization of a small (50 lbs) vacuum tumble fitted with a variable speed drive. This vacuum tumbler should be able to achieve speeds of 25 to 35 cycles per minute and be capable of pulling a vacuum of –25 Hg. The shrimp pieces are tumbled for about 10 minutes.

During this coating or envelopment period, the natural proteins and excess moisture contained in the shrimp meat are released into the binding solution via the hand massaging or the mechanical vacuum tumbling while, at the same time, the shrimp tissues absorb the glue-like viscous starch which develops the bonding capabilities of the composite shrimp pieces. A strong bonding of the substrate shrimp parts is desired since further processing, such as coating of the composite shrimp product, or ultimate cooking techniques require the shrimp composite parts to be thoroughly bound together to maintain the appearance of a larger size shrimp.

Figure 3:
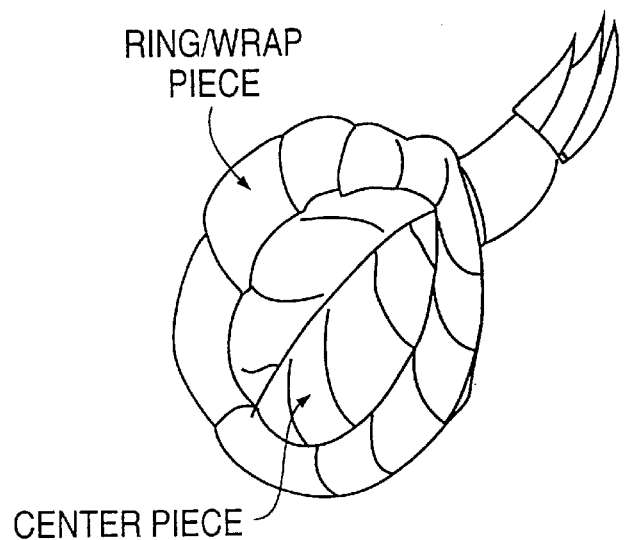
FIG. 3 depicts the bonded composite shrimp.

Upon expiration of the approximately 45 minutes of soaking or enveloping with the starch-base solution and periodic massaging, vacuum tumbling, or similar methods of enveloping the shrimp pieces with the starch-based solution, the tail-on, butterfly three-fourths cut center piece shrimp are placed on a surface, preferably a plastic (polyethylene) mesh tray, with the dorsal/outside up. This piece is flattened and straightened. A tail-off butterfly buttonhole-Western cut ring/wrap shrimp piece is then individually placed (dorsal side up) on top of and wrapped around each of the tail-on butterfly three-fourths cut center piece shrimp with the hole centered on the center piece shrimp and with the tail ends matching location in the composite creating the appearance of one larger size tail-on shrimp. The center piece should be visible and the ring piece should be fully stretched around it. The center piece and the ring piece should have some surface contact for the product to adhere. See FIG. 3. Care should be exercised to avoid cutting the ring/wrap piece on either one of its ends during the stretching and shaping. Once shaped, the product is allowed to settle in its final form for a period of no less than 30 minutes (preferably in a cool place at about 33° F.) during which time the excess moisture is drained/evaporated and the binding of the composites takes place.

It is important to note that the process of overlapping the buttonhole-Western cut ring/wrap shrimp piece as described above is a very important and unique process. Furthermore, if a tailless embodiment of the final composite product is desired, a tailless butterfly three-fourth cut center shrimp piece may be utilized in place of the tail-on center piece in the above described procedure. Combinations of different size shrimp are used to obtain a target size larger shrimp. The composite resembles a butterfly shrimp with excellent plate coverage. It is wider and it has a smaller tail than a typical (non-bonded) shrimp of this size. Once coated/breaded and cooked (fried or oven reconstituted) this composite will sustain the most typical eating habits without disruption to its cohesion.

Alternatively, instead of submerging or coating the shrimp substrate pieces in a starch-based solution, both portions of the composite shrimp may be bonded using an edible binder or binding agent which enables the pieces to adhere to each other to form the larger composite shrimp. One such bonding agent which can be utilized is FIBREMIX® which is available from FNA Foods Inc. of 233, 10601 Southport Road, S.W., Calgary, Alberta T2W 3M6 Canada. The FIBREMIX® comprises packages of fibrinogen and bottles of thrombin solutions which must be stored frozen at temperatures of about −40° C. Each fibrinogen pouch should be inspected for leaks or purges prior to thawing as water may dilute the fibrinogen solution. The frozen fibrinogen pouches and thrombin bottles are placed in a water bath at a temperature of about 25° C.–27° C. (80° F.–85° F.) to thaw. During the thawing process, the pouches may optionally be moved gently to ensure all protein is dissolved thoroughly for maximum functionality. It is important that all protein is dissolved and this can be deduced by observing the clarity of the fibrinogen in the pouch. The thrombin is ready for use as soon as all the ice is melted.

The thawed fibrinogen and thrombin are combined together in a ratio of 20:1 (by volume) and are mixed for about 5–10 seconds (1 pouch fibrinogen to 1 bottle thrombin is a 20:1 ratio). It is advisable not to mix more than can be processed in 10 to 15 minutes. The quantity of FIBREMIX® to be used depends primarily on the amount of product by weight the worker is going to be able to assemble in a period of 10 minutes. The fibrinogen/thrombin solution should be applied to the chilled shrimp at temperatures between about 2° C. and 4° C. (36° F. to 39° F.) ensuring that the outer edge of the center shrimp piece and the inner edge of the ring/wrap shrimp piece are well covered with the solution.

The composite shrimp are assembled in the usual manner by first placing the cut center piece shrimp on a surface with the dorsal/cut side up. This piece is flattened and straightened. Using a brush or with the tip of a finger, the binding agent is generously applied to the exposed surface outer edge of the shrimp. Then the binding agent is also generously applied to the bottom inner edge of the ring/wrap piece. The ring/wrap piece is then carefully placed (dorsal side up) with the hole centered on the center piece and with the tail ends matching location in the composite. The worker needs to verify that all surfaces where the substrates come in contact are fully and generously coated with the glue-like binding agent. The center piece should still be visible and the ring piece should be fully stretched around it. Care should be exercised to avoid cutting the ring/wrap piece on one of its ends during the stretching and shaping of the embodiment. Once shaped, the product is allowed to settle in its final form for a period of no less than about 30 minutes (preferably in a cool place at about 33° F.) during which the excess moisture is drained/evaporated and the binding of the composites takes place. The less the composite shrimp is handled at this point, the better the resulting binding will be. The steps of this process must be followed in rapid succession (within about 5 to 8 minutes) to ensure maximum binding strength and functionality.

The binder agent is the glue-like component of this composite and it has several functions. It maintains the composites shrimp sufficiently bonded to be able to sustain further processing (such as IQF freezing, packaging, frying . . . ) without disruption to the shape. It prevents product dehydration during transportation and storage (raw or frozen). Most importantly, if effectively maintains the final product together as a whole through the different processes and cooking techniques to which it might be subjected, and especially during the must crucial time when the consumer eats it by biting into the product or cuts it with a knife.

Because of the stronger bond formed, the FIBREMIX® binder is preferred for utilization in products which require further processing and which may or may not require the coating of the shrimp with another food product. The nature of some of the further process steps or cooking techniques may require a stronger bonding of the substrates or shrimp parts.

The FIBREMIX® bonded composite also resembles a butterfly shrimp with excellent plate coverage. It is wider and it has a smaller tale than a typical (non-bonded) shrimp of this size. This composite will sustain the most typical preparations, cooking techniques, and eating habits without disruption to its cohesion. The reasons this cohesion is maintained are the bonding agent used in the preparation of the substrate pieces, and the specific arrangement and configurations of these substrate pieces.

Another embodiment of the present invention includes a product formed using both binding agent, FIBREMIX® and the starch-based binding agent, MS-27. This combination process is most preferred for utilization in products which require further processing that may require the coating of the shrimp with another food product and, because of the nature of the further processing or cooking techniques, a stronger bonding of the substrates or shrimp parts is required. In this particular process, in addition to bonding the composite pieces with FIBREMIX®, the composite is also soaked in the MS-27 bonding agent for better performance when used in a breading or coating type application.

Specifically, the cut center piece shrimp is placed on a surface with the dorsal/cut side up. This piece is flattened and straightened. Using a brush or with the tip of the finger, the FIBREMIX® binding agent is applied to the exposed surface outer edge of the shrimp. Then, the FIBREMIX® binding agent is also applied to the bottom inner edge of the ring/wrap piece. The ring/wrap piece is then carefully placed (dorsal side up) with the hole centered on the center piece and with the tail ends matching location in the composite. The worker needs to verify that both surfaces where the substrates come in contact are fully and generously coated with the glue-like binding agent. The center piece should still be visible and the ring piece should be fully stretched around it. Care should be exercised to avoid cutting the ring/wrap piece on one of its ends during the stretching and shaping of the embodiment.

Once shaped, the product is allowed to settle in its final form for a period of no less than 30 minutes (preferably in a cool place at about 33° F.) during which the excess moisture is drained/evaporated off and the binding of the composite takes place. Later, the product is soaked in the MS-27 starch-based solution for a period of no less than about 45 minutes. During this period the natural protein and excess moisture contained in the shrimp meat are released into the solution. At the same time the shrimp tissues absorbs the solution.

The binder agent, FIBREMIX® is the glue-like component of this composite and it has several functions. It maintains the composites sufficiently bonded to be able to sustain further processing (such as IQF freezing, packaging, frying . . . ) without disruption to the shape or bonding. It prevents product dehydration during transportation and storage (raw or frozen). Most importantly, it effectively maintains the final product together as a whole through the different processes and cooking techniques to which it might be subjected, and during the most crucial time when the consumer eats it by biting into the product or cuts it with a knife.

In addition, the MS-27 binding agent imparts the following functions. It further prevents product dehydration during transportation and storage (raw or frozen). It significantly enhances the breading type coating adhesion to the shrimp composite. It reduces product shrinkage during the pre-frying and frying processes (eliminating cavern-like appearance between the coating and the substrate). It enhances product flavor, texture and "bite". Most importantly, it helps to maintain the final product together as a whole (which at this point is composed of two bonded shrimp and the coating/breading) during the must crucial time, when the consumer eats it by biting into the product or cuts it with a knife.

This embodiment also resembles a butterfly shrimp with excellent plate coverage. It is wider and it has a smaller tale than a typical (non-bonded) shrimp of this size. This composite will also sustain the most typical preparations, cooking techniques, and eating habits without disruption to its cohesion. The reasons this cohesion is maintained are the bonding agent used in the preparation of the substrate pieces and the specific arrangement and configuration of these substrate pieces.

After forming and aligning the merged composite shrimp products they are preferably placed on plastic mesh trays so that they are spaced apart from each other. After they are allowed to rest in their final form for a period of no less than about thirty minutes in a cool place, preferably at about 33 degrees Fahrenheit, the composite shrimp may also be optionally coated (surfaced glazed) one last time with the starch-based solution before the trays are sent through a mechanical IQF (individual quick freeze) freezing tunnel to preserve the composite shrimp product.

Another alternative binder which may be utilized in the present invention is "ACTIVA" TG-B produced by Ajinomoto Co., Inc. 1-15-1 Kyobasi Chou-ku, Tokyo 104, Japan. This food binding adhesive contains a transglutaminase enzyme and requires no heating, freezing, salt or phosphate additions to bind. The composition comprises about 0.6% transglutaminase; about 60.0% sodium caseinate; about 5.0% sugar ester and about 34.4% dextrin. The TGase activity is approximately 60 units/gram. An oxygen absorber ("AGELESS") is contained inside the original package and after the package is opened it should be kept in a freezer.

In this embodiment of the present invention, the cuts of the shrimp substrates are the same, however, the enriched binding agent is prepared by suspending an amount of "ACTIVA" TG-B in cold water. This suspension is then quickly added to a quantity of shrimp meat. The combination is thoroughly mixed and finely ground to form a paste-like material which is quickly distributed for usage at the work tables. The suspending, mixing, grinding and distribution should be done rapidly and preferably within 30 minutes. This paste-like binder is then generously applied to the surface of the center shrimp piece and the ring/wrap shrimp piece is placed on top of the center piece and shaped as usual. Although this is the most preferred method, the paste-like material can also be generously applied to both of the shrimp pieces or either of the shrimp pieces before they are shaped together. The shrimp pieces are thus enveloped or coated with the enriched bonding agent and adhesive capabilities are developed. The composite product is then allowed to rest at a temperature of about 35° F. for a period of about two hours. After which, the composite can be further processed, such as by coating or by freezing.

The shrimp composites are individually rapidly frozen to a temperature of about minus 10° F. within a period of around 10 minutes which is typical of seafood freezing processes. The freezer air temperature may range from about −30 degrees to −35 degrees Fahrenheit. The preferred temperature being −35 degrees Fahrenheit.

Freezing is required for preservation of the product, if the product is to be further processed outside the premises of the initial processing, to prevent microbial decomposition. In the typical freezing process, the composite product is placed on a plastic mesh to facilitate transportation and to guard the product during the freezing process. The composite product is introduced in the freezing line on the mesh and conveyed through the IQF freezer for a period of time that varies (depending on the size of shrimp and the freezer parameters) between about 3 and 10 minutes. Once frozen, the product is removed from the mesh tray prior to packaging.

The preferred freezing equipment utilized in this process is a double straight lane YORK JET-FREEZE®/REFREEZE® combination IQF freezer. This is a two-module, high velocity, double impingement freezer followed by a re-freeze unit. The temperature of the air in this freezer is about −35° F. and the air velocity is about 9000 ft/min. The time to fully freeze the product is less than 10 minutes. The conveyor on this IQF freezer is fitted with plastic overlay for easy release of products. All of the interior of the IQF freezer and the product contact surfaces are constructed of stainless steel, aluminum, or food grade plastics.

The mesh used in the freezing process is made of black polyethylene. The properties of this material make it ideal for low temperature processing and product release. The perforations on the mesh allow product drainage during preparation and good airflow during freezing.

If the product is to be further processed (for example, breaded or similarly coated) at the initial processing premises, freezing prior to the breading is not required. However, freezing is required if the product is to be further processed (e.g., breaded, etc.) outside the initial processing premises to prevent microbial decomposition. If the composite product is to be coated at the initial processing premises, the composite would be assembled or placed on a moving conveyor (rather than on the meshes) which conveys it to the breading equipment on a mechanical breading/coating line. The breading line configuration is specific to the final product specifications and requirements, such as, the type of breading, coating, spices, etc. which are desired.

The final product is generally packaged in bulk inside a master box with a divider fitted with a plastic liner bag or bags. This master box is specially designed to safeguard the integrity of the product during the rigors of shipment. Of course, the type of packaging and the weight configuration of the final packaging of the various product embodiments can vary and can be flexible depending on the needs of the customer.

It is important to note that the process of the present invention is not limited to any particular species of shrimp, and in fact different shrimp species can be mixed in the supply of shrimp for processing according to this invention. It is also important to understand that the binding agents effectively meld together the paired shrimp pieces in each composite. The freezing process merely preserves the perishable seafood.

EXAMPLES

The invention will be further clarified by a consideration of the following examples which are intended to be purely illustrative.

Example 1

Manufacturing Procedure

Work area: The work was performed on sanitary stainless steel tables. The table surface is slanted from the center to the edge. The edge ends are fitted with gutters. Each table has eight working stations, and half of the stations have water spigots.

Workers: The workers are assembled in teams of four. Each worker will conduct specific processes during raw material preparation.

Raw Material: Shrimp Size. The shrimp size used in the composite is specific to the final product size requirements, however, it generally involves two independent pieces that may or may not be equal in size. In this specific embodiment, two 60/70 size shrimp were used to obtain one composite 41/50 size shrimp. The raw materials were received in the specific work areas in the processing plant in the following conditions: fresh, graded, headless, and with the shell on.

Raw Material Preparation

Center piece preparation: The shells were removed from a quantity of the above described shrimp. The tails could be removed or left on depending on customer/product demands/specifications. In this embodiment, the tails and the last segment of the shell were left on. The shrimp were then cut along their dorsal side with an incision that extended the complete length of the shrimp. The depth of this incision was targeted at ¾ of the shrimp's depth. (See FIG. 1.) The veins were also removed as the shrimp were washed under a stream of water.

Figure 2:
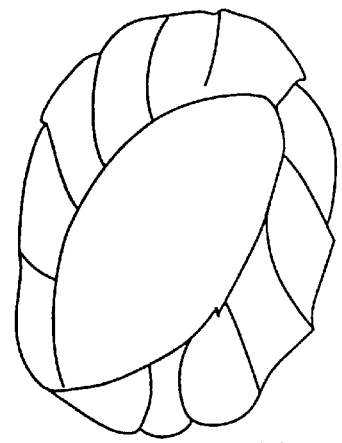
FIG. 2 depicts a peeled tail-off shrimp cut into a butterfly buttonhole-Western ring/wrap substrate.

Ring/wrap piece preparation: The shells were removed from an equal quantity of the fresh, graded, headless shrimp as were prepared for the center pieces. The tails were removed. The shrimp were then cut ¾ of their length leaving the ends uncut with an incision that completely traverse the depth of the shrimp. The veins were also removed as the shrimp were washed under a stream of water. Each piece was separated at the incision and shaped in the form of a flat ring. (See FIG. 2.)

Binding Agent MS-27: Binding Agent MS-27, as previously described herein, was utilized to bond the substrates or shrimp parts together to form the composite shrimp product. The independent composites (center piece and ring/wrap piece) were fully submerged in or enveloped with this viscous, binding starch-based solution for a minimum period of 45 minutes. During this period the natural proteins and excess moisture contained in the shrimp meat were released into the solution. At the same time, the shrimp tissues absorbed the glue-like, viscous solution. The composites were regularly hand massaged every five minutes while submerged in the solution.

Assembly/binding: After both portion of the composite shrimp pieces were fully and generously enveloped with the Binding Agent MS-27 solution for a period of 45 minutes during which they were regularly massaged. The center piece was placed on a surface of a plastic mesh tray with the dorsal/cut side up. This piece was flattened and straightened. Then, the ring/wrap piece was carefully placed (dorsal side up) with the hole centered on the center piece with the tail ends matching location in the composite. The center piece was still visible and the ring piece was fully stretched around it. The center piece and the ring/wrap piece had sufficient surface contact for adherence. See FIG. 3. Care was exercised to avoid cutting the ring/wrap piece on one of its ends during the stretching and shaping.

Once shaped, the composite shrimp were arranged and aligned on the mesh tray so that they were spaced apart from each other. The composite shrimp were then allowed to settle in their final form for a period of no less than 30 minutes in a cool place at about 33 degrees F. during which time the excess moisture was drained/evaporated off and the binding of the composites took place.

The composite shrimp were then sent through a mechanical IQF (individual quick freeze) freezing tunnel to preserve the composite shrimp product. A freezing temperature of about −30 degrees Fahrenheit was utilized to individually quick-freeze the composite shrimp within a period of 10 minutes. The trays then exited the freezing unit and the frozen composite shrimp were separated from the mesh trays to be packaged for shipment.

The composite resembled a butterfly shrimp with excellent plate coverage. It was wider and had a smaller tale than a typical non-bonded shrimp of this size. Once cooked (fried, oven reconstituted, or otherwise prepared) this composite will sustain the most typical eating habits without disruption to its cohesion.

Example 2

The same manufacturing procedure and raw material preparations of the substrate shrimp pieces were performed as described in Example 1 but instead of a starch-based binder, the FIBREMIX® binder agent was employed. The substrate shrimp were not submerged in the binding solution. The shrimp were, instead, enveloped with the FIBREMIX® solution as previously described herein and as further noted below.

Assembly/binding: In this embodiment, the center piece was placed on a mesh surface with the dorsal/cut side up and it was flattened and straightened. Using a brush, the FIBREMIX® binding agent was carefully applied to the outer edges of the exposed surface of the shrimp. Then FIBREMIX® was also applied to the bottom inner edge surface of the ring/wrap piece prior to being carefully placed (dorsal side up) on top of the center piece shrimp with the hole centered on the center piece and with the tail ends matching location in the composite. In other words, all surfaces where the substrates come in contact with each other were fully and generously coated with the glue-like binding agent. The center piece was visible and the ring piece was fully stretched around it. Care was taken to avoid cutting the ring/wrap piece on one of its ends during the stretching and shaping of the composite.

Once shaped, the composite shrimp were arranged and aligned on a mesh tray so that they were spaced apart from each other. The composite shrimp were then allowed to settle in their final form for a period of no less than 30 minutes in a cool place at about 33 degrees F. during which time the excess moisture was drained/evaporated off and the binding of the composites took place.

The composite shrimp were then sent through a mechanical IQF (individual quick freeze) freezing tunnel to preserve the product. A freezing temperature of about −35 degrees Fahrenheit was utilized to individually quick-freeze the composite shrimp within a period of about 10 minutes. The trays then exited the freezing unit and the frozen composite shrimp were separated from the mesh trays and packaged for shipment.

The composite resembled a butterfly shrimp with excellent plate coverage. It was wider and had a smaller tail than a typical non-bonded shrimp of this size. Once coated and cooked, this composite shrimp product will sustain the most typical eating habits without disruption to its cohesion.

Example 3

The same manufacturing procedure, binder agent and starch based solution as described in Example 1 were utilized in this embodiment, except that, in the raw material shrimp preparations, the tails were removed from all of the substrate shrimp and the envelopment method was by means of vacuum tumbling as described below.

Equipment: This procedure required the utilization of a small (50 lb) vacuum tumbler fitted with a variable speed drive. This vacuum tumbler was able to achieve speeds of 25 to 35 cycles per minute and was capable of pulling a vacuum of −25 Hg. The equipment and preparation table were sanitized every two hours of operation Arrangement: Two groups of workers composed of four workers each were assembled at the same type working tables as previously described. Each table had a vacuum tumbler.

Procedure: The raw materials were prepared in the same fashion as previously described. Fifteen pounds of center-pieces and an equal amount of ring/wrap pieces were prepared. After the 15 lb of center-pieces were processed, they were introduced into the vacuum tumbler. 2.1 lb (14% by weight) of MS-27 were added to the tumbler. The tumbler was set at about 35 cycles per minute and a vacuum of −25 Hg was pulled. The product mixture was allowed to tumble for a period of 10 minutes. During this period, the natural proteins and excess moisture was released into the solution. At the same time, the solution mixture is re-absorbed by the meat tissue. The center-pieces were then removed from the tumbler and the ring pieces were introduced. 2.4 lbs (16% by weight) of MS-27 was added to the tumbler. The tumbler was at about 35 cycles per minute and a vacuum of −25 Hg was pulled. The product mixture was allowed to tumble for a period of 10 minutes. During this period the center pieces were aligned on the mesh trays. Once tumbled, the ring/wrap pieces were removed from the tumbler and arranged on the center pieces as described in other examples.

The resulting composite resembled a wide, butterfly tail-less shrimp with excellent plate coverage. Once cooked, this composite shrimp product will sustain the most typical eating habits without disruption to its cohesion.

Example 4

The same manufacturing procedure, binder agent and envelopment procedure as described in Example 2 were utilized in this embodiment, except that, in the raw material shrimp preparations, the tails were removed from all of the substrate shrimp. The composite tailless shrimp in this embodiment were subjected to an additional final surface glaze coating with the MS-27 starch-based solution, prior to freezing.

The resulting composite resembled a wide, butterfly, tail-less shrimp with excellent plate coverage. Once coated and/or cooked, this composite shrimp product will sustain the most typical eating habits without disruption to its cohesion.

Example 5

The same manufacturing procedures and raw material preparations of the substrate shrimp were performed as in Example 2. The FIBREMIX® bonding agent was employed as previously described herein and as noted in Example 2 to bind and form the composite; however, this embodiment was additionally subjected to a 45-minute emersion in the MS-27 starch based solution.

Assembly/binding: In this embodiment, the cut center piece was placed on a mesh surface with the dorsal cut side up and it was flattened and straightened. Using a brush or the tip of the finger, the FIBREMIX® was carefully applied to the outer edges of the exposed surfaces of the shrimp. Then, the FIBREMIX® was applied to the bottom inner edge surfaces of the ring/wrap piece prior to being arranged around the center piece (i.e., the hole was centered on the center piece like a halo, and the tail ends of both pieces were matched in location in the composite). The worker verified that all surfaces where the substrates come in contact with each other were fully and generously coated with the FIBRE-MIX® solution, that the center piece was visible and that the ring piece was fully stretched and flattened around it. Care was taken to avoid cutting the ring/wrap piece on either one of its ends during the shaping and stretching of the composite.

Once shaped and arranged on the mesh tray, the shrimp were then allowed to settle in their final form for a period of no less than about 30 minutes in a cooler at about 33 degrees F. During which time the excess moisture was drained/evaporated off and the further bonding of the substrates took place. Then, the composite shrimp were taken out of the cooler and submerged in the MS-27 starch-based solution. In the solution, they were left to rest for a period of no less than about 45 minutes (static emersion). Once they were soaked in the solution for about 45 minutes, they were re-arranged on the mesh tray and aligned such that they were not touching each other.

The trays were then introduced into the mechanical IQF freezer to preserve the product. An air temperature of about −35° F. was utilized to individually quick freeze the product within a period of no more than 10 minutes. In this period, the temperature of the product dropped to a desired −10° F. The trays then exited the freezing tunnel and the frozen composite shrimp were separated from the mesh trays and packaged for shipment.

The composite resembled a butterfly shrimp with excellent plate coverage. It was wider and had a smaller tail than a typical non-bonded shrimp of its size. Once coated and cooked, this composite shrimp product will sustain the most typical eating habits without disruption to its cohesion.

Example 6

The same manufacturing procedures, raw material preparations of the substrate shrimp, FIBREMIX® bonding procedure, and additional emersion in the MS-27 starch-based solution were employed as described in Example 5 except that vacuum tumbling was utilized instead of a static soak in the MS-27 starch-based solution to form the composite. This embodiment was further subjected to a bread coating process and a pre-frying process prior to the freezing and packaging processes.

Assembly/binding: In this embodiment, the center piece was placed on a mesh surface with the dorsal cut side up and it was flattened and straightened. Using a brush or the tip of the finger, the FIBREMIX® was carefully applied to the outer edges of the exposed surfaces of the shrimp. Then, the FIBREMIX® was applied to the bottom inner edge surfaces of the ring/wrap piece prior to it being arranged around the center piece (the hole being centered on the center piece like a halo, and the tail ends of both pieces matching location in the composite). The worker verified that all surfaces where the substrates come in contact with each other were fully and generously coated with the FIBREMIX® solution, that the center piece was visible and that the ring piece was fully stretched and flattened around it. Care was taken to avoid cutting the ring/wrap piece on either one of its ends during the shaping and stretching of the composite.

Once shaped and arranged on the mesh tray, the shrimp were then allowed to settle in their final form for a period of no less than about 30 minutes in a cooler at about 33 degrees F. During which time the excess moisture was drained/evaporated off and the further binding of the substrates took place. Then, a 15 lb batch of composite shrimp were taken out of the cooler and introduced into the vacuum tumbler, which was herein previously described. Sixteen percent by weight of MS-27 solution, about 2.4 lbs, was added to the tumbler. The tumbler was set at about 25 cycles per minute and a vacuum of −25 Hg was pulled. The product mixture was allowed to tumble for a period of 10 minutes. During this period, the natural proteins and excess moisture were again released into the solution. At the same time, the solution mixture was re-absorbed by the meat tissue. The composite shrimp were then placed on a transfer conveyor to be sent through a breading line.

In this example, an approximately 50% breading coated product was prepared. To achieve the 35% breading pick-up, four machines were placed in-line. A double curtain batter applicator such as a STEIN® model APB-16, at 10% pick-up, was first utilized. The batter applicator was followed by a preduster type applicator such as the STEIN® model 100-16E. The preduster added about 10% of a flour like ingredient. Another batter applicator (same make and model and configuration as the first batter applicator) followed the preduster, applying a 12% coat of a batter to the product. The final step in the application procedure was a final coating with "Japanese" breading, which is a courser, larger crumb size breading, using a STEIN® model AE-16J applying a 10% coating. To set the coating, the product was introduced into a pre-fryer such as STEIN® model FA-5 for a quick (20 seconds) flash frying. The weight pick-up from the frying was roughly 8%.

The breading line was placed in front of the mechanical IQF freezer to enable the transfer of the product directly onto the conveyor of the freezer. The product is frozen for preservation during shipment and storage. An air temperature of about −35° F. was utilized to individually quick freeze the product within a period of no more than about 10 minutes. In this period, the temperature of the product dropped to a desired −10° F. The product then exited the freezing tunnel and the frozen composite shrimp were packaged for shipment.

The composite resembled a semi-cooked butterfly shrimp coated with an edible coating with excellent plate coverage. It was wider and had a smaller tail than a typical non-bonded shrimp of its size. This composite shrimp product will sustain the most typical eating habits without disruption to its cohesion.

Example 7

The same manufacturing procedure and raw material preparation of the substrate shrimp were performed as described in Example 1 but instead of using a starch-based binder, "ACTIVA" TG-B binding agent was utilized. About 10 g of "ACTIVA" TG-B, as previously described herein, was suspended in about 40 ml of cold water. This suspension was added to about 1 kg of shrimp meat. The combination was quickly mixed and finely ground to form a paste-like material which was then quickly distributed to the work tables for the previously described assembly of the composite shrimp.

The prepared and cut center piece shrimp was placed on the mesh and the top surface was generously coated with the paste-like mixture. The ring/wrap piece was then placed on top of the center shrimp piece and shaped as previously described. The composite shrimp was allowed to rest at 35° F. for two hours. After which, the composite shrimp was coated and frozen in the previously described manner. This composite shrimp also resembled a butterfly shrimp with excellent plate coverage. It also, after being cooked, will sustain the most typical eating habits without disruption to its cohesion.

Although certain embodiments of the present invention have been illustrated and described, it will become apparent to those of ordinary skill in this art that various modifications and changes may be made without departing from the spirit of the invention or from the scope of the following claims.

What is claimed is:

1. A method of making a large composite shrimp product from a plurality of smaller shrimp, comprising the steps of:
   (a) providing a supply of raw, deheaded, peeled shrimp;
   (b) removing the tails from a quantity of said shrimp and cutting these shrimp to form butterfly buttonhole-Western cut ring/wrap shrimp pieces;
   (c) cutting a similar quantity of shrimp to form butterfly three-fourths cut center shrimp pieces;
   (d) enveloping said cut shrimp pieces with a bonding agent;
   (e) placing said bonding-enveloped ring/wrap shrimp piece on top of and around each of the bonding-enveloped center shrimp pieces to form a composite which has an appearance of a larger size shrimp.

2. The method of claim 1 further comprising the step of resting said formed composite shrimp at a cool temperature for at least about 30 minutes to allow excess moisture to escape and to enhance bonding.

3. The method of claim 2 further comprising the step of glazing the composite shrimp with a starch-based agent prior to the resting step.

4. The method of claim 3 further comprising the step of coating the composite shrimp with an edible batter or coating.

5. A composite shrimp prepared by the method of claim 4.

6. The method of claim 2 further comprising the step of enveloping the rested formed composite shrimp with a starch-based agent.

7. A composite shrimp prepared by the method of claim 6.

8. The method of claim 2 in which the resting temperature is about 33° F. to about 35° F.

9. The method of claim 2 further comprising the step of preserving said composite shrimp by freezing.

10. The method of claim 9 wherein the freezing comprises rapidly freezing to an air temperature of about minus 35° F. within a period of no greater than about 10 minutes, wherein the temperature of the composite shrimp is about −10° F.

11. A composite shrimp prepared by the method of claim 9.

12. The method of claim 1 wherein massaging occurs during the enveloping period.

13. The method of claim 12 wherein the massaging is by hand.

14. The method of claim 12 wherein the massaging is by vacuum tumbling.

15. A composite shrimp prepared by the method of claim 14.

16. A composite shrimp prepared by the method of claim 12.

17. The method of claim 1 further comprising the step of removing the tails from the shrimp before cutting them into butterfly three-fourths cut center shrimp pieces.

18. A composite shrimp prepared by the method of claim 17.

19. A composite shrimp prepared by the method of claim 1.

20. A composite shrimp prepared by the method of claim 2.

21. A composite shrimp product, comprising: a peeled, tailless, shrimp piece adhesively bonded on top of and around another peeled center shrimp piece said composite having an appearance of a shrimp that is larger in size than either of the singular shrimp pieces.

22. The shrimp product according to claim 21 which is frozen.

23. The shrimp product according to claim 21 wherein the center shrimp piece is smaller than the shrimp piece adhesively bonded on top of and around it.

24. The shrimp product according to claim 21 further comprising an edible coating.

25. The shrimp product according to claim 24 which is frozen.

26. The shrimp product according to claim 21 wherein the tailless shrimp piece comprises a butterfly buttonhole Western ring/wrap cut piece and the shrimp piece on which it is adhesively bonded comprises a butterfly three-fourths cut center shrimp.

27. The shrimp product according to claim 26 in which the butterfly three-fourths cut center shrimp piece is also tailless.

28. The shrimp product according to claim 27 which is frozen.

29. A method for assembling a plurality of smaller shrimp into a shrimp composite, comprising the steps of:
  (a) providing a supply of raw, deheaded, peeled, tail-on shrimp;
  (b) providing a supply of raw, deheaded, peeled, tail-off shrimp;
  (c) cutting said tail-off shrimp to form butterfly buttonhole-Western cut ring/wrap shrimp pieces;
  (d) cutting the tail-on shrimp to form butterfly three-fourths cut center shrimp pieces;
  (e) enveloping said cut shrimp with a binder agent to develop bonding capabilities;
  (f) massaging binder-enveloped shrimp;
  (g) placing and aligning each massaged, binder-enveloped, tail-on, butterfly three-fourths cut center piece shrimp on a mesh tray so that they are spaced apart from each other;
  (h) placing the massaged, binder-enveloped, tail-off, butterfly buttonhole-Western cut ring/wrap shrimp on top of and around the center piece shrimp to form a composite which has an appearance of a larger size shrimp;
  (i) glazing the composite shrimp with a starch based agent; and
  (j) preserving said composite shrimp by freezing.

30. The method of claim 29 further comprising the step of coating each shrimp composite with an edible batter or coating before freezing.

31. A method for assembling a plurality of smaller shrimp into a shrimp composite, comprising the steps of:
  (a) providing a supply of raw, deheaded, peeled, tail-on shrimp;
  (b) providing a supply of raw, deheaded, peeled, tail-off shrimp;
  (c) cutting said tail-off shrimp to form butterfly buttonhole-Western cut ring/wrap shrimp pieces;
  (d) cutting the tail-on shrimp to form butterfly three-fourths cut center shrimp pieces;
  (e) coating said cut shrimp with a binder to develop bonding capabilities;
  (f) placing and aligning each tail-on, butterfly three-fourths cut center piece shrimp on a surface so that they are spaced apart from each other;
  (g) placing the binder-coated, tail-off, butterfly buttonhole-Western cut ring/wrap shrimp on top of and around the center piece shrimp to form a composite which has an appearance of a larger size shrimp;
  (h) enveloping the composite shrimp with a starch-based agent; and
  (i) preserving said composite shrimp by freezing.

32. The method of claim 31 wherein the enveloping of the composite shrimp is by static emersion.

33. The method of claim 31 wherein the enveloping further includes vacuum tumbling.

34. The method of claim 31 further comprising coating the shrimp composite with an edible coating before freezing.

* * * * *